8 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

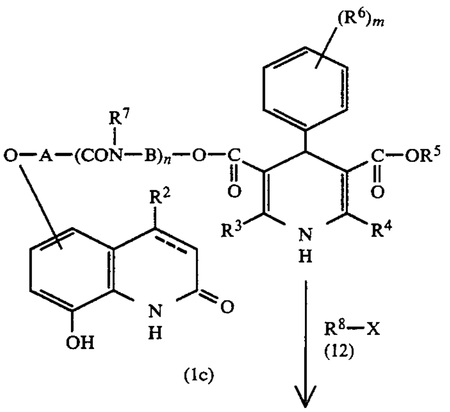

(1c)

$$v'_{ref}(t) = K\, r\, \delta\left(t - \frac{2L - 2d_s}{v_w}\right) + K(1 - r^2)e^{-2\alpha_s d_s}$$

$$\cos\beta^* = \frac{K_2 - n\frac{T'}{v''}}{\sqrt{K_1^2 + \left(K_2 - n\frac{T'}{v''}\right)^2 + K_3^2}}$$

8 PT.

are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful $$(K_1x+K_2y+K_3z+T)+n(K''_1x+K''_2y+K''_3z+T'')=0$$

| $r_1$ ($L_1$) | $r_6$ ($L_3$) | $r_7$ ($L_4$) |
|---|---|---|
| K = 1.0 | K = 1.0 | K = 0.0 |
| $C_2$ = 0.0 | $C_2$ = 0.0 | $C_2$ = 0.0 |
| $C_4$ = −0.15691 × 10−6 | $C_4$ = +0.95381 × 10−7 | $C_4$ = −0.22891 × 10−5 |
| $C_6$ = −0.40068 × 10−10 | $C_6$ = −0.73871 × 10−10 | $C_6$ = +0.12283 × 10−9 |
| $C_8$ = +0.21016 × 10−13 | $C_8$ = +0.12280 × 10−13 | $C_8$ = +0.84230 × 10−13 |
| $C_{10}$ = −0.37685 × 10−17 | $C_{10}$ = −0.33177 × 10−17 | $C_{10}$ = −0.20592 × 10−16 |

$f_1$ = 314.6
$f_2$ = 88.0
$f_3$ = −481.2
$f_4$ = −99.6

2

100mm

= 101.2 Aperture ratio: 1:1.10
agnification of projection: −7.997x
alf angle of view: 28.56°

| | | | |
|---|---|---|---|
| 43.454 | $d_1$ = 11.0 | $n_1$ = 1.49380 | $L_1$ |
| -1542.254 | $d_2$ = 68 | | |
| 16.976 | $d_3$ = 20.0 | $n_2$ = 1.62286 | $L_2$ |
| 10.914 | $d_4$ = 2.87 | | |
| -89.375 | $d_5$ = 5.0 | $n_3$ = 1.59501 | $L_3$ |
| -127.071 | $d_6$ = 58.8 | | |
| -48.609 | $d_7$ = 5 | $n_4$ = 1.49380 | $L_4$ |
| ∞ | | | |
| ∞ | $d_8$ = 5 | $n_5$ = 1.45000 | S |
| ∞ | $d_9$ = 8 | $n_6$ = 1.51872 | G |

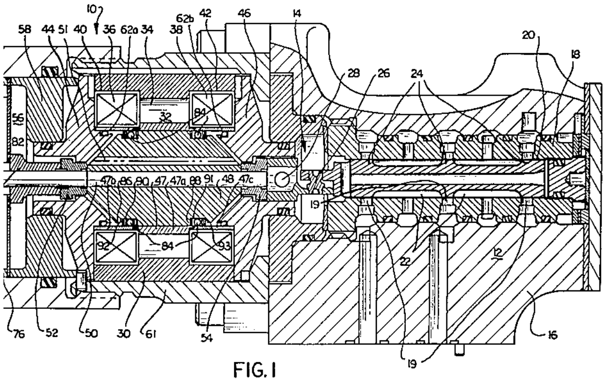

FIG. I

IMAGE SYSTEM
TEST TARGET
A
U.S. DEPARTMENT OF COMMERCE
PATENT AND TRADEMARK OFFICE

[redacted]

In order that the preparation of the azo compounds of our invention may be entirely clear, the preparation of the amine compounds used in their manufacture is indicated hereinafter:

Compounds of the formula:

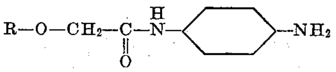

wherein R is an alkyl group, can be prepared by reacting p-nitroaniline with an alkoxyacetic acid such as methoxyacetic acid, ethoxyacetic acid, n-propoxyacetic acid and n-butoxyacetic acid and reducing the nitro group of the resulting compound to its amine form. This reaction will be clear from the following example.

*Preparation of p-aminomethoxyacetanilide*

138 grams of p-nitroaniline and 135 grams of methoxyacetic acid are heated under a short refluxing column at 165–170° C. for 10 hours. Water containing a small amount of methoxyacetic acid is collected during the reaction. When the reaction is complete, that is, when p-nitromethoxyacetanilide has been formed, the excess methoxyacetic acid is removed under reduced pressure and about 41 grams of excess methoxyacetic acid are recovered.

The crude product obtained as above having a melting point of about 95–100° C. is removed from the reaction and is placed, together with one liter of water, in a shaking autoclave at 100° C., 5 grams of Raney nickel catalyst are added, and sufficient hydrogen to effect the reduction of the nitro group is passed into the autoclave. By this reaction, the nitro group is quickly converted to an amino group and when the reaction is complete and the reaction vessel cooled, the product is removed by washing the autoclave with water. A yield of 171 grams or 95% of p-aminomethoxyacetanilide is obtained.

By substituting ethoxyacetic acid, n-propoxyacetic acid and n-butoxyacetic acid for methoxyacetic acid in the above reaction, p-aminoethoxyacetanilide, p-amino-n-propoxyacetanilide and p-amino-n-butoxyacetanilide, respectively, can be obtained. It is here noted that when large scale reductions are carried out great care must be exercised because of the exothermic properties of the reduction reaction.

The alkoxyacetic acids used in the above reactions are, in part, at least known to the art. They can be prepared by reacting sodium methylate, sodium ethylate, n-sodium propylate and n-sodium butylate, respectively, with chloracetic acid.

Compounds of the above formula, wherein R is an alkoxyalkyl group, such as methoxyethyl or ethoxyethyl, can be prepared by the substitution of an appropriate acid for the alkoxyacetic acids employed in the foregoing reactions. Thus,

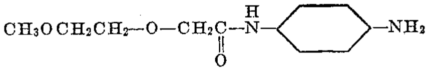

and

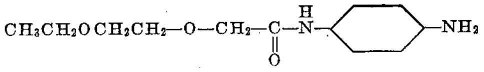

can be prepared by reacting p-nitroaniline with $CH_3OCH_2CH_2OCH_2COOH$ $CH_3CH_2OCH_2CH_2OCH_2COOH$ respectively, and reducing the nitro group of the resulting compounds to amino groups.

The first named of these alkoxyalkyl acetic acids can be prepared by reacting the sodium salt of the monomethyl ether of ethylene glycol with chloracetic acid. The second of these acids can be prepared by reacting the sodium salt of the monoethyl ether of ethylene glycol with chloracetic acid. By chloracetic acid, of course, is meant $ClCH_2COOH$.

Compounds wherein R of the formula given is a hydroxyalkyl group such as β-hydroxyethyl and β,γ-dihydroxypropyl can be prepared by reacting p-nitroaniline with $HOCH_2CH_2OCH_2COOH$ and $HOCH_2CHOHCH_2—O—CH_2COOH$, respectively, and reducing the nitro group of the resulting compounds to the amino group. The first of the acids indicated above can be prepared by reacting mono-β-chlorsodiumethylate with chloracetic acid and then hydrolyzing the resulting compound with NaOH, for example, to convert the chlorine atom to a hydroxyl group. The second of these acids can be prepared by reacting the monosodium salt of glycerin with chloracetic acid.

Compounds of the formula:

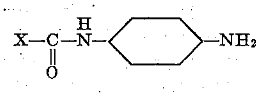

wherein X is a hydroxyalkyl group such as methylol,

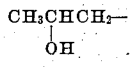

$HOCH_2CH_2—$, $CH_3CH_2CHOHCH_2—$,

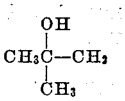

and

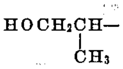

can be prepared by reacting p-nitroaniline with glycollic acid, β-hydroxybutyric acid, β-hydroxypropionic acid (hydracrylic acid), β-hydroxy-n-valeric acid, β-hydroxyisovaleric acid and β-hydroxyisobutyric acid, respectively, and reducing the nitro group of the compounds formed to amino groups. This reduction can, of course, be carried out following the general procedure indicated in connection with the preparation of p-aminomethoxyacetanilide.

p-Aminoformanilide used in the preparation of the dye of Example 1 is a known compound. This compound, however, can be prepared by reducing p-nitroformanilide in accordance with the procedure disclosed by applicants in connection with the reduction of p-nitromethoxyacetanilide. p-Nitroformanilide can be prepared as described in Journal Chemical Society, vol. III, page 190 (1917).

The azo compounds of our invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus,